US012072070B2

(12) United States Patent
Vilem et al.

(10) Patent No.: US 12,072,070 B2
(45) Date of Patent: Aug. 27, 2024

(54) LIGHTING EFFECT SYSTEM

(71) Applicant: ROBE lighting s.r.o., Roznov pod Radhostem (CZ)

(72) Inventors: Jan Vilem, Valasske Mezirici (CZ); Petr Nemec, Krhova (CZ); Josef Valchar, Prostredni Becva (CZ)

(73) Assignee: ROBE lighting s.r.o., Roznov pod Radhostem (CZ)

( * ) Notice: Subject to any disclaimer, the term of this patent is extended or adjusted under 35 U.S.C. 154(b) by 0 days.

(21) Appl. No.: 18/596,434

(22) Filed: Mar. 5, 2024

(65) Prior Publication Data

US 2024/0209998 A1 Jun. 27, 2024

(51) Int. Cl.

| | |
|---|---|
| ***F21L 14/00*** | (2006.01) |
| ***F21V 5/00*** | (2018.01) |
| ***F21V 5/02*** | (2006.01) |
| ***F21V 9/08*** | (2018.01) |
| ***F21V 13/02*** | (2006.01) |
| ***F21V 17/02*** | (2006.01) |
| ***F21V 21/14*** | (2006.01) |
| ***F21V 21/30*** | (2006.01) |
| *F21Y 101/00* | (2016.01) |

(52) U.S. Cl.

CPC .............. *F21L 14/00* (2013.01); *F21V 5/006* (2013.01); *F21V 5/008* (2013.01); *F21V 5/02* (2013.01); *F21V 9/083* (2013.01); *F21V 13/02* (2013.01); *F21V 17/02* (2013.01); *F21V 21/145* (2013.01); *F21V 21/30* (2013.01); *F21Y 2101/00* (2013.01)

(58) Field of Classification Search

CPC ........................................................ F21L 14/00

See application file for complete search history.

(56) References Cited

U.S. PATENT DOCUMENTS

| | | | | |
|---|---|---|---|---|
| 2006/0187654 | A1* | 8/2006 | Jungel-Schmid ....... | F21V 17/02 362/147 |
| 2014/0355264 | A1* | 12/2014 | Chinniah .................. | F21K 9/65 362/241 |
| 2016/0372256 | A1* | 12/2016 | Mackh ................ | H01F 27/2804 |
| 2016/0377265 | A1* | 12/2016 | Hansen ..................... | F21V 9/40 362/268 |

(Continued)

FOREIGN PATENT DOCUMENTS

| | | | | |
|---|---|---|---|---|
| DE | 102017122956 A1 * | 2/2019 | ................ | F21S 2/00 |
| WO | 2021238291 A1 | 12/2021 | | |

*Primary Examiner* — Zheng Song

(74) *Attorney, Agent, or Firm* — Conley Rose, P.C.; Brooks W Taylor

(57) ABSTRACT

An optical system and luminaire are provided. The optical system includes first and second lighting effect assemblies. Each lighting effect assemblies include an effect selector and a lighting effect insert rotatably coupled thereto. Each effect selector positions its lighting effect insert in a light beam. The lighting effect inserts include a prism with a rear surface and a front side having a first plurality of facets. The rear surface has a plurality of regions aligned with corresponding facets. The regions are color filters. Some lighting effect inserts are an effects plate and a prism, where the effects plate has color filter regions. The effects plate and the prism may be separately rotatable at desired speeds and/or directions. Some lighting effect inserts are a prism with color filter regions on the facets.

23 Claims, 6 Drawing Sheets

(56) References Cited

U.S. PATENT DOCUMENTS

| | | | | |
|---|---|---|---|---|
| 2017/0234510 | A1* | 8/2017 | Wang | F21V 5/008 362/340 |
| 2017/0268749 | A1* | 9/2017 | Pet | G02B 26/123 |
| 2018/0231210 | A1* | 8/2018 | Nakamura | F21S 43/26 |

* cited by examiner

LIGHTING EFFECT SYSTEM

TECHNICAL FIELD OF THE DISCLOSURE

The disclosure generally relates to automated luminaires, and more specifically to a lighting effect system for use in an automated luminaire.

BACKGROUND

Luminaires with both manual and automated remotely controllable functionality are well known in the entertainment and architectural lighting markets. Such products are commonly used in theatres, television studios, concerts, theme parks, night clubs, and other venues. A typical automated luminaire provides control, from a remote location, of the output intensity, color, and other functions of the luminaire, and may allow an operator to control such functions for many luminaires simultaneously. Many automated luminaires additionally or alternatively provide control from the remote location of other parameters such as position, focus, zoom, beam size, beam shape, effects, and/or beam pattern of light beam(s) emitted from the luminaire.

BRIEF DESCRIPTION OF THE DRAWINGS

For a more complete understanding of the present disclosure and the advantages thereof, reference is now made to the following description taken in conjunction with the accompanying drawings in which like reference numerals indicate like features and wherein.

SUMMARY

Figure 1:
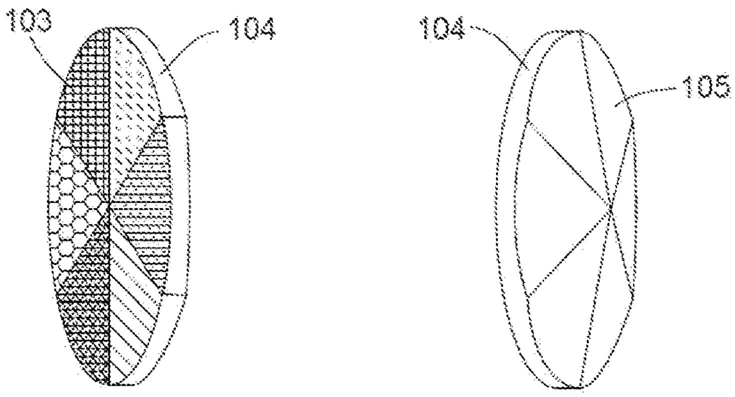
FIG. 1 presents front and rear views of a first prism according to the disclosure.

In a first embodiment, an optical system includes a first lighting effect assembly and a second lighting effect assembly. The first lighting effect assembly includes a first effect selector and a first lighting effect insert that is rotatably coupled to the first effect selector. The first effect selector is configured to position the first lighting effect insert in a light beam passing through the optical system. The first lighting effect insert includes a first prism that has a first rear surface and a first front side. The first front side includes a first plurality of facets. The first rear surface includes a first plurality of regions, where each region is aligned with a corresponding facet of the first plurality of facets. A first region of the first plurality of regions is configured as a color filter having a first color and a second region of the first plurality of regions is configured as a color filter having a second color. The second lighting effect assembly includes a second effect selector and a second lighting effect insert that is rotatably coupled to the second effect selector. The second effect selector is configured to position the second lighting effect insert in the light beam. The second lighting effect insert includes a second prism that has a second rear surface and a second front side. The second front side includes a second plurality of facets. The second rear surface includes a second plurality of regions, where each region is aligned with a corresponding facet of the second plurality of facets. A first region of the second plurality of regions is configured as a color filter having a third color and a second region of the second plurality of regions is configured as a color filter having a fourth color.

In a second embodiment, an optical system includes a lighting effect assembly that includes an effect selector and a lighting effect system that is rotatably coupled to the effect selector. The effect selector is configured to position the lighting effect system in a light beam passing through the optical system with an optical axis of the lighting effect system coaxial with an optical axis of the light beam. The lighting effect system includes an effects plate and a prism. The prism comprises a rear surface and a front side. The front side includes a plurality of facets. The effects plate includes a surface having a plurality of regions, where a first region of the plurality of regions is configured as a color filter having a first color and a second region of the plurality of regions is configured as a color filter having a second color. The light beam passes through the effects plate and is divided into a plurality of light beams corresponding to the plurality of regions. The plurality of light beams are projected in a plurality of directions corresponding to the plurality of facets.

In a third embodiment, an optical system includes a first lighting effect assembly and a second lighting effect assembly. The first lighting effect assembly includes a first effect selector and a first lighting effect insert rotatably coupled to the first effect selector. The first effect selector is configured to position the first lighting effect insert in a light beam passing through the optical system. The first lighting effect insert includes a first prism having a first front side comprising a first plurality of facets. A first facet of the first plurality of facets is configured as a color filter having a first color and a second facet of the first plurality of facets is configured as a color filter having a second color. The second lighting effect assembly includes a second effect selector and a second lighting effect insert rotatably coupled to the second effect selector. The second effect selector is configured to position the second lighting effect insert in the light beam. The second lighting effect insert includes a second prism having a second front side comprising a second plurality of facets. A first facet of the second plurality of facets is configured as a color filter having a third color and a second facet of the second plurality of facets is configured as a color filter having a fourth color.

In a fourth embodiment, a luminaire includes a head and power circuits configured to provide electrical power to electrical circuits of the head. The head includes a light source, a first lighting effect assembly, and a second lighting effect assembly. The light source is configured to emit a light beam and the first lighting effect assembly is optically coupled to the light source. The first lighting effect assembly includes a first effect selector and a first lighting effect insert that is rotatably coupled to the first effect selector. The first effect selector is configured to position the first lighting effect insert in the light beam. The first lighting effect insert includes a first prism that has a first rear surface and a first front side that includes a first plurality of facets. The first rear surface includes a first plurality of regions, where each region is aligned with a corresponding facet of the first plurality of facets. A first region of the first plurality of regions is configured as a color filter having a first color and a second region of the first plurality of regions is configured as a color filter having a second color. The second lighting effect assembly is optically coupled to the first lighting effect assembly. The second lighting effect assembly includes a second effect selector and a second lighting effect insert that is rotatably coupled to the second effect selector. The second effect selector is configured to position the second lighting effect insert in the light beam. The second lighting effect insert includes a second prism that has a second rear surface and a second front side that includes a second plurality of facets. The second rear surface includes a second plurality of regions, where each region is aligned with a corresponding facet of the second plurality of facets. A first region of the second plurality of regions is configured as a color filter having a third color and a second region of the second plurality of regions is configured as a color filter having a fourth color.

DETAILED DESCRIPTION

Preferred embodiments are illustrated in the figures, like numerals being used to refer to like and corresponding parts of the various drawings.

A prism is a glass or plastic device placed at a point in an optical system such that it converts a light beam comprising a single image produced by beam color, size, shape, and/or pattern optical devices of the optical system into multiple light beams emitted from the optical system. A prism acts as a beam splitter. For example, a linear prism may convert a single light beam into a linear array of identical light beams. Prisms may be different shapes and may be configured to be inserted or removed independently in the light beam. The optical system may be configured to enable an operator to insert multiple prisms in the light beam, producing a combined effect in the light beam.

FIG. 1 presents front and rear views of a first prism 104 according to the disclosure. The prism 104 is a pyramidal prism having six facets 105 on a front side of the prism 104. A rear surface of the prism 104 is divided into six regions 103 that are each aligned with one of the facets 105.

Each of the six facets 105 projects a light beam entering the rear surface of the prism 104 in a direction that is determined by an angle of the facet 105. That is, each of the facets 105 projects a copy of the light beam entering the prism 104 from the rear surface, and each copy is projected (or emitted) in a different direction (e.g., at a different angle to an optical axis of the prism 104). The prism 104 thus projects a circle of copies of the light beam and may also be referred to as a circular prism.

The prism 104 may be manufactured from glass or transparent polymer or resin. Each of the regions 103 on the rear surface is configured as a color filter by coating the regions 103 with a thin film dichroic or other coloring technique. In one embodiment, a thin film dichroic coating is applied to the rear surface of prism 104 through a series of masks, so as to color each region 103 with a different thin film dichroic coating. In a further embodiment, the thin film dichroic coating may be applied to the entire surface and then selectively removed through etching or laser ablation. Each region 103 may be the same color or different colors, as indicated by the differing cross-hatching patterns in FIG. 1. While all six of the regions 103 are shown as coated (i.e., colored) in FIG. 1, in other embodiments, one or more of the regions 103 may be left uncoated. Light passing through the prism 104 will be split into six output light beams, one light beam per facet 105, with each output light beam colored by the corresponding region 103.

Figure 2:
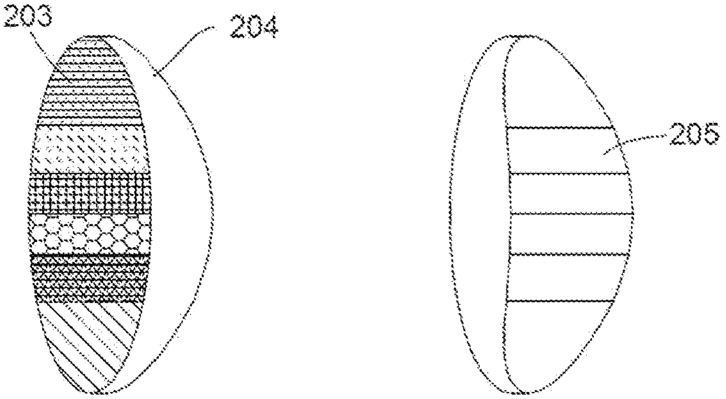
FIG. 2 presents front and rear views of a second prism according to the disclosure.

FIG. 2 presents front and rear views of a second prism 204 according to the disclosure. The prism 204 is a linear prism having six facets 205 on a front side of the prism 204. A rear surface of the prism 204 is divided into six regions 203 that are each aligned with one of the facets 205. The prism 204 may be manufactured from glass or transparent polymer or resin. Each of the regions 203 on the rear surface is configured as a color filter by coating the region 203 with a thin film dichroic or other coloring technique.

Each of the six facets 205 projects a light beam entering the rear surface of the prism 204 in a direction that is determined by an angle of the facet 205. That is, each of the facets 205 projects a copy of the light beam entering the rear surface of the prism from, and each copy is projected (or emitted) in a different direction (e.g., at a different angle to an optical axis of the prism 204).

In one embodiment, a thin film dichroic coating is applied to the rear surface of prism 204 through a series of masks, so as to color each region 203 with a different thin film dichroic coating. In a further embodiment, the thin film dichroic coating may be applied to the entire surface and then selectively removed through etching or laser ablation. Each region 203 may be the same color or different colors, as indicated by the differing cross-hatching patterns in FIG. 2. While all six of the regions 203 are shown as coated (i.e., colored) in FIG. 2, in other embodiments, one or more of the regions 203 may be left uncoated. Light passing through the prism 204 will be split into six output light beams, one light beam per facet 205, with each output light beam colored by the corresponding region 203.

Figure 3:
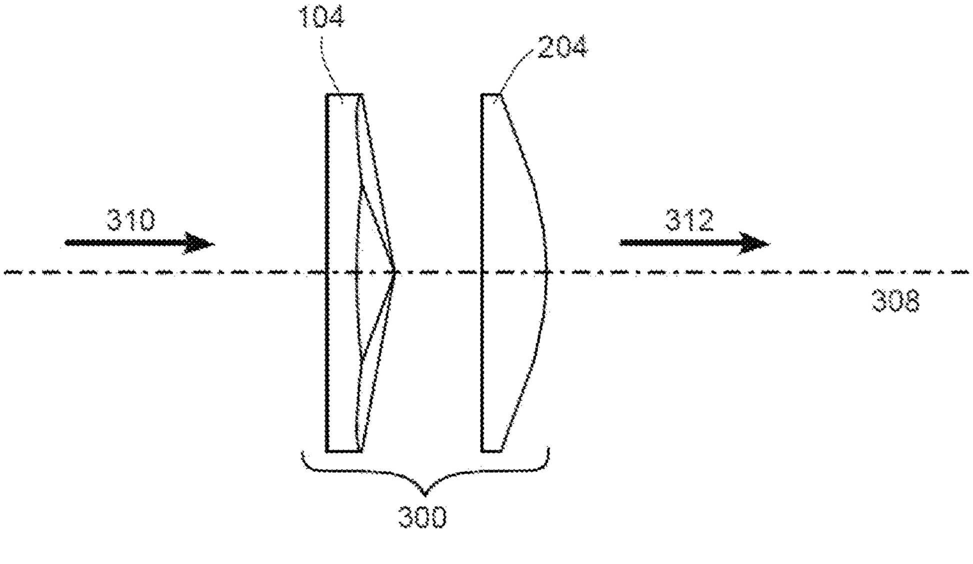
FIG. 3 presents a side view of a first lighting effect system according to the disclosure.

FIG. 3 presents a side view of a first lighting effect system 300 according to the disclosure. The lighting effect system 300 includes the prism 104 and the prism 204 described with reference to FIGS. 1 and 2, respectively. A light beam 310 enters the prism 104 and is split into six first output beams by the facets 105, as described above. Each of the six first output beams enters the prism 204 and each first output beam is further split into a six second output beams by the facets 205. A resulting light beam 312 emitted from the facets 205 exits the light effect system 300. The light beam 312 may pass through further optical systems before exiting a luminaire in which the lighting effect system 300 is installed. The light beams 310 and 312 are projected along an optical axis 308. The prisms 104 and 204 have individual optical axes that are coaxial with the optical axis 308. The prisms 104 and 204 are not limited to the pyramidal and linear prisms shown in FIG. 3 and, in other embodiments, may be of any shape or prism type with any number of facets.

In some embodiments, each of the prisms 104 and 204 is configured to be inserted or removed from the light beam 310 independently. In some such embodiments, the insertion and removal is performed by manual or motorized systems (not shown in FIG. 3). In further embodiments, each of the prisms 104 and 204 is configured to be rotated independently around its individual optical axis. In some such embodiments, the rotation is performed by manual or motorized systems (not shown in FIG. 3). Thus one, the other, or both of the prisms 104 and 204 may be moved into the light beam 310 and rotated around the optical axis 308. Such insertion and rotation combinations create an optical effect with multiple colored light beams.

Figure 4:
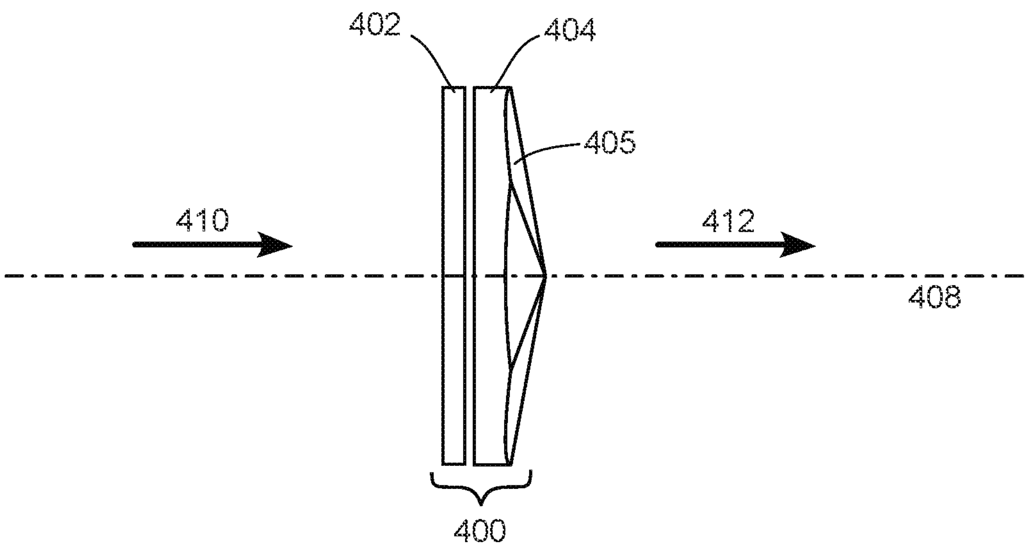
FIG. 4 presents a side view of a second lighting effect system according to the disclosure.
Figure 5:
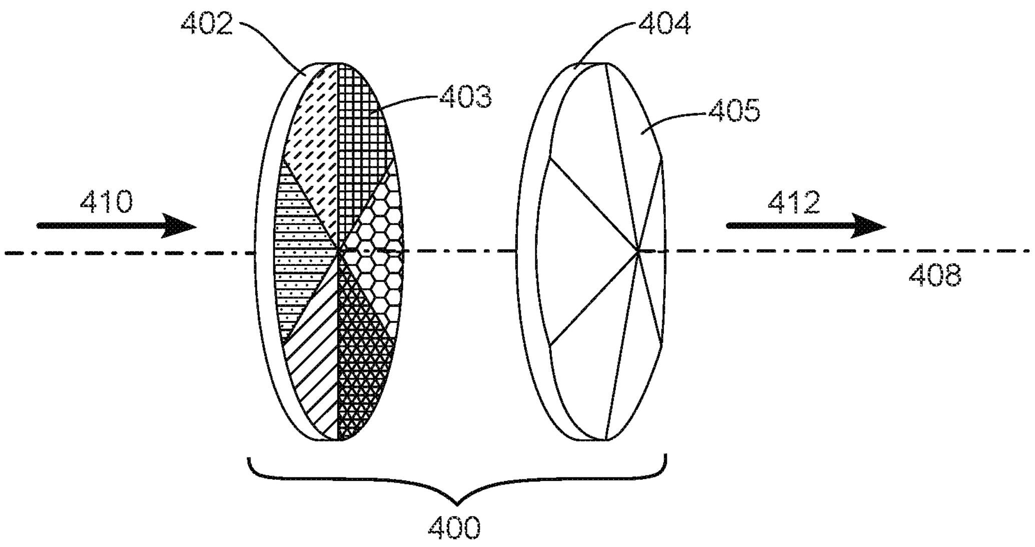
FIG. 5 presents an exploded front view of the second lighting effect system of FIG. 4.

FIG. 4 presents a side view of a second lighting effect system 400 according to the disclosure. FIG. 5 presents an exploded front view of the second lighting effect system 400 of FIG. 4. The lighting effect system 400 comprises an effects plate 402 and a prism 404. The prism 404 has a rear surface and a front side including six facets 405, each of which directs a copy of the light beam entering the prism 404 in a different direction. The facets 405 divide the circular prism 404 into six sectors of a circle The effects plate 402 is positioned adjacent to the rear surface of the prism 404 and a surface of the effects plate 402 is divided into six regions 403. The six regions 403 are sectors of a circle that match the six facets 405 in size and positioning on the effects plate 402.

In the lighting effect system 400, the regions 403 are on a surface of the effects plate 402 that is adjacent to the prism 404, however, in other embodiments, the regions 403 may be on another surface of the effects plate 402. The effects plate 402 may be planar glass, transparent polymer, or resin. In other embodiments, the effects plate 402 may be an optical lens such as a plano-convex lens or plano-concave lens.

Each of the regions 403 is configured as a color filter by coating the region 403 with a thin film dichroic coating or other coloring technique. Each region 403 may be the same color or different colors, as indicated by the differing cross-hatching patterns in FIG. 5. While all six of the regions 403 are shown as coated (i.e., colored) in FIG. 5, in other embodiments, one or more of the regions 403 may be left uncoated.

A light beam 410 entering the lighting effect system 400 and passing through the effects plate 402 and the prism 404 is divided into one light beam per region 403. A light beam 412 emitted from the lighting effect system 400 comprises the output light beams from the regions 403 projected in different directions by the prism 404. The light beams 410 and 412 are projected along an optical axis 408. The effects plate 402 and the prism 404 have individual optical axes that are coaxial and establish an optical axis of the lighting effect system 400. The optical axis of the lighting effect system 400 is coaxial with the optical axis 408.

In some embodiments, each of the effects plate 402 and the prism 404 is configured to be inserted or removed independently in the light beam 410. In some such embodiments, the insertion and removal is performed by manual or motorized systems (not shown in FIG. 4).

In further embodiments, each of the effects plate 402 and the prism 404 is configured to be rotated independently around its individual optical axis or to remain fixed at a current angle of rotation. In some such embodiments, the rotation is performed by manual or motorized systems (not shown in FIG. 4). Thus one, the other, or both of the effects plate 402 and the prism 404 may be moved into the light beam 410 and rotated around the optical axis 408. Such insertion and rotation combinations create an optical effect with multiple colored light beams. The prism 404 is not limited to the pyramidal six-facet prism shown in FIG. 4 and, in other embodiments may be of any shape or prism type with any number of facets.

In a further embodiment, the effects plate 402 and the prism 404 are physically connected and configured to be inserted and removed together as a unitary assembly 400 from the light beam 410 by manual or motorized systems. In some such embodiments, each of the effects plate 402 and the prism 404 is configured to be rotated independently around the optical axis 408.

Figure 6:
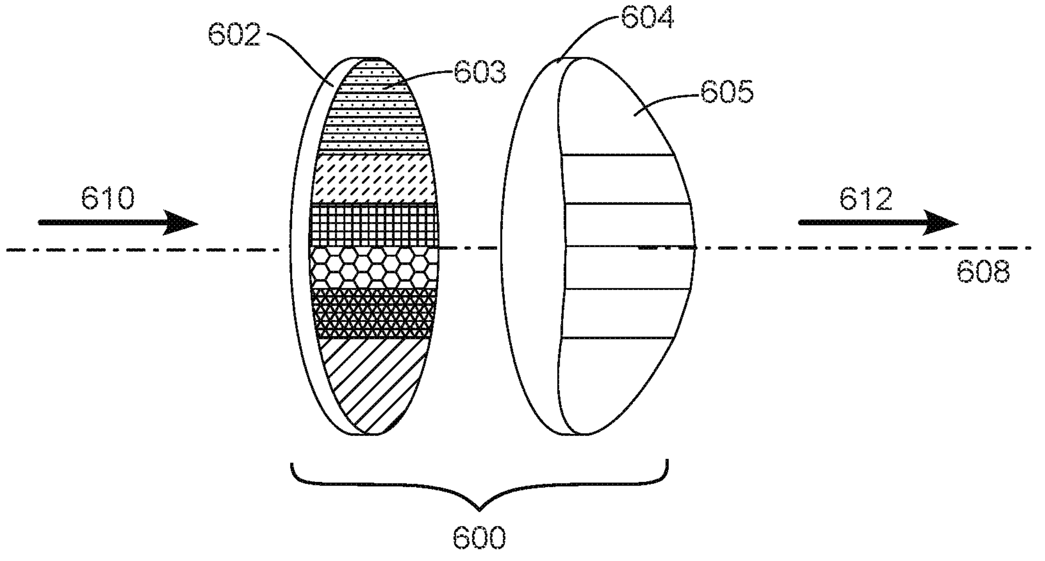
FIG. 6 presents an exploded front view of a third lighting effect system according to the disclosure.

FIG. 6 presents an exploded front view of a third lighting effect system 600 according to the disclosure. The lighting effect system 600 comprises an effects plate 602 and a prism 604. The prism 604 has six linear facets 605, each of which will direct a copy of a light beam entering the prism 604 in a different direction. The facets 605 divide the prism 604 into six stripes The effects plate 602 is positioned adjacent to a rear face of the prism 604 and is divided into six regions 603. The six regions 603 are stripes that match the six facets 605 in size and positioning on the effects plate 602.

In the lighting effect system 600, the regions 603 are on a surface of the effects plate 602 that is adjacent to the prism 604 however, in other embodiments, the regions 603 may be on another surface of the effects plate 602. The effects plate 602 may be planar glass, transparent polymer, or resin. In other embodiments, the effects plate 602 may be an optical lens such as a plano-convex lens or plano-concave lens.

Each of the regions 603 is configured as a color filter by coating the region 603 with a thin film dichroic coating or other coloring technique. Each region 603 may be the same color or different colors, as indicated by the differing cross-hatching patterns in FIG. 6. While all six of the regions 603 are shown as coated (i.e., colored) in FIG. 6, in other embodiments, one or more of the regions 603 may be left uncoated.

A light beam 610 entering the lighting effect system 600 and passing through the effects plate 602 and the prism 604 is split into different output light beams, one light beam per region 603. A resulting light beam 612 comprises the output light beams from the regions 603 projected in different directions by the prism 604. The light beams 610 and 612 are projected along an optical axis 608. The effects plate 602 and the prism 604 have individual optical axes that are coaxial and establish an optical axis of the lighting effect system 600. The optical axis of the lighting effect system 600 is coaxial with the optical axis 608.

In some embodiments, each of the effects plate 602 and the prism 604 is configured to be inserted or removed from the light beam 610 independently. In some such embodiments, the insertion and removal is performed by manual or motorized systems (not shown in FIG. 6). In further embodiments, each of the effects plate 602 and the prism 604 is configured to be rotated independently around its individual optical axis. In some such embodiments, the rotation is performed by manual or motorized systems (not shown in FIG. 6). Thus one, the other, or both of the effects plate 602 and the prism 604 may be moved into the light beam 610 and rotated around the optical axis 608. Such insertion and rotation combinations create an optical effect with multiple colored light beams. The prism 604 is not limited to the six-facet linear prism shown in FIG. 6 and, in other embodiments may be of any shape or prism type with any number of facets. In a further embodiment, the effects plate 602 and the prism 604 are physically connected and configured to be inserted and removed together as a unitary assembly 600 from the light beam 610 by manual or motorized systems. In some such embodiments, each of the effects plate 602 and the prism 604 is configured to be rotated independently around the optical axis 608.

Figure 7:
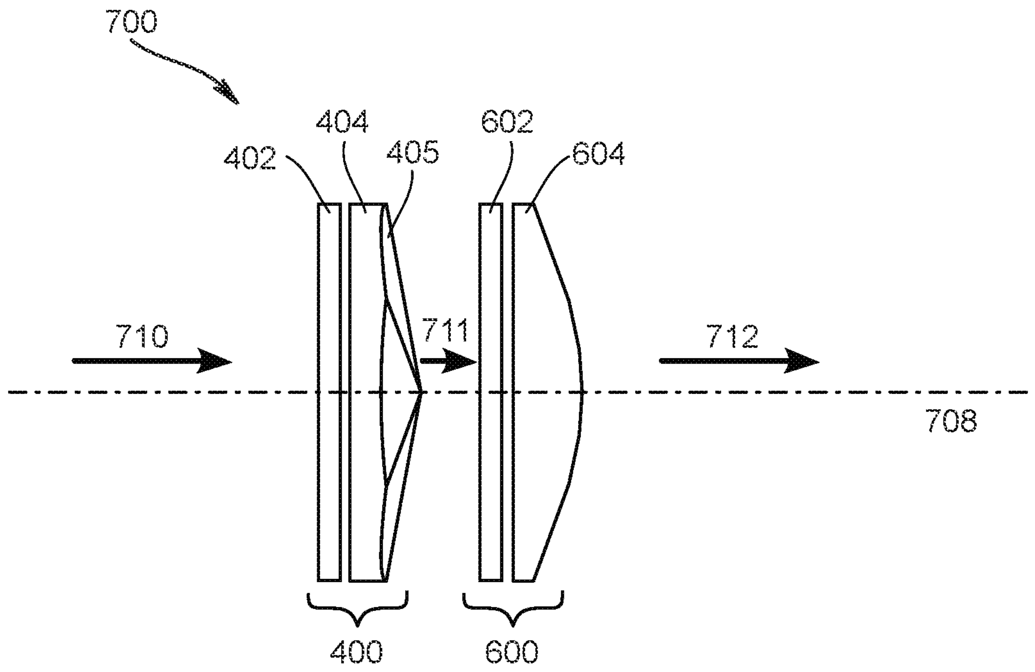
FIG. 7 presents a side view of a fourth lighting effect system according to the disclosure.

FIG. 7 presents a side view of a fourth lighting effect system 700 according to the disclosure. The lighting effect system 700 comprises the lighting effects system 400 (i.e., the effects plate 402 and the prism 404 of FIGS. 4 and 5) and the lighting effects system 600 (i.e., the effects plate 602, and prism 604 of FIG. 6). A light beam 710 enters the effects plate 402 and the prism 404 where it is split into a light beam 711 comprising a plurality of colored light beams, one colored light beam per facet 405. The light beam 711 enters the effects plate 602 and prism 604 where each light beam of the plurality of colored light beams is further split into a light beam 712, which comprises another plurality of colored light beams. The light beam 712 is emitted from the lighting effect system 700. The light beam 712 may pass through further optical systems before exiting a luminaire in which the lighting effect system 700 is installed. The light beams 710 and 712 are projected along an optical axis 708. The effects plates 402 and 602 and the prisms 404 and 604 have individual optical axes that are coaxial with the optical axis 708.

In a further embodiment, the effects plate 402 and the prism 404 are physically connected and configured to be inserted and removed together as a unitary assembly 400 in the light beam 710 by manual or motorized systems. In some such embodiments, each of the effects plate 402 and the prism 404 is configured to be rotated independently around the optical axis 608. In some embodiments, the effects plate 602 and the prism 604 are physically connected and configured to be inserted and removed together as a unitary assembly 600 in the light beam 711 by manual or motorized systems. In some such embodiments, each of the effects plate 602 and the prism 604 is configured to be rotated independently around its individual optical axis.

In such embodiments, one, the other, or both of the lighting effects system 400 and the lighting effects assembly 600 may be moved into the light beams 710 and 711, respectively, and rotated around the optical axis 708 so as to create an optical effect with multiple colored light beams. In a yet further embodiment all four of effects plates 402 and 602, and prisms 404 and 604 may be independently capable of being inserted or removed from and/or rotated around an axis parallel to optical path 708 through motorized systems (not shown in FIG. 7). As described above, the prisms 404 and 604 are not limited to shapes and types shown herein and may be of any prism type with any number of facets.

Figure 8:
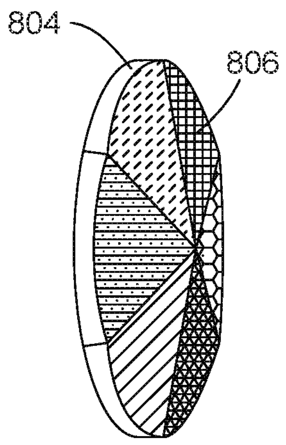
FIG. 8 presents a front view of a third prism according to the disclosure.
Figure 9:
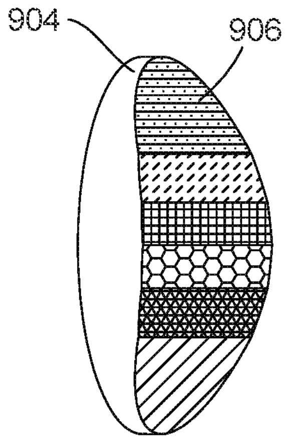
FIG. 9 presents a front view of a fourth prism according to the disclosure.

FIG. 8 presents a front view of a third prism 804 according to the disclosure. FIG. 9 presents a front view of a fourth prism 904 according to the disclosure. The prism 804 is a pyramidal prism having six facets 806. The prism 904 is a linear prism having six linear facets 906. As described above for the prisms 104 and 204 of FIGS. 1 and 2, each facet of the prism 804 (or the prism 904) emits a copy of a light beam entering the prism in a corresponding direction.

The following description discusses the prism 804, but also describes the prism 904. The prism 804 may be manufactured from glass or transparent polymer or resin. Each facet 806 is configured as a color filter. Each facet 806 may be colored by coating with a thin film dichroic coating or other coloring technique. Each facet 806 may be the same color or different colors as indicated by the differing cross-hatching patterns in FIG. 8. While all six of the facets 806 are shown as coated (i.e., colored) in FIG. 8, in other embodiments, one or more of the facets 806 may be left uncoated. A light beam passing through the prism 804 will be split into a plurality of output light beams, one light beam per facet 806, with each output light beam colored if the facet 806 is colored. The prism 804 is not limited to the pyramidal six-facet prism shown in FIG. 8 and, in other embodiments may be of any shape or prism type with any number of facets.

Figure 10:
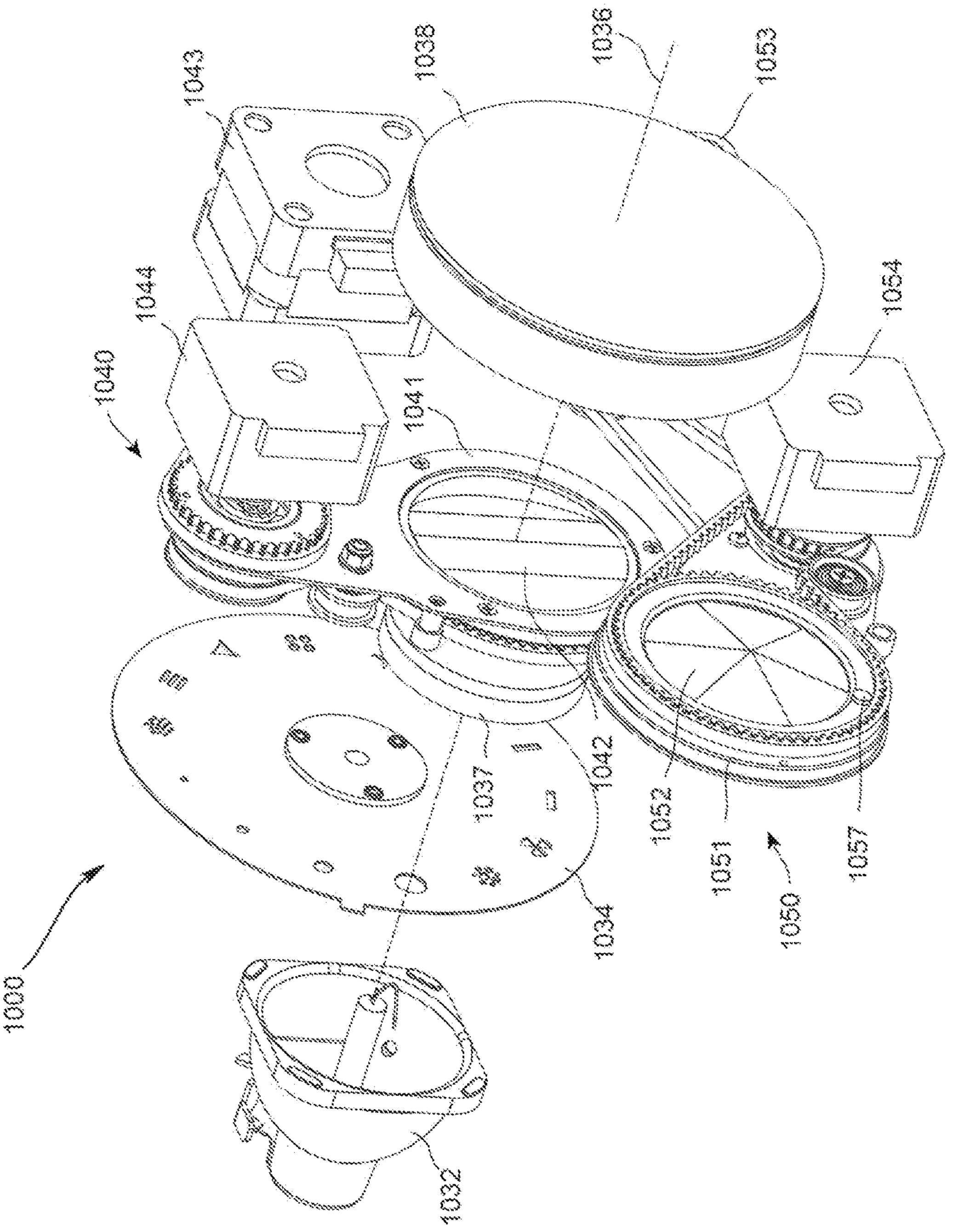
FIG. 10 presents an optical system of an automated luminaire comprising a lighting effect system according to the disclosure.

FIG. 10 presents an optical system 1000 of an automated luminaire comprising a lighting effect system according to the disclosure. The optical system 1000 comprises lighting effect assemblies 1040 and 1050. A light source 1032 may be a discharge lamp, LED, laser, or other light source, and produces a light beam 1036 whose optical axis is shown by a dotted line 1036. The light beam 1036 passes through at least the gobo wheel 1034 and optical lenses 1037 and 1038 before being emitted from the luminaire. The system is shown here much simplified for clarity and, in practice, the automated luminaire may include further optical devices including but not restricted to, a color wheel, a color mixing device, a rotating gobo, an effects wheel, an iris, framing shutters, or other optical devices.

The lighting effect assembly 1040 includes a lighting effect insert 1042, rotatably coupled to an effect selector 1041. A motor 1044 is configured to rotate the lighting effect insert 1042 within the effect selector 1041. A motor 1043 is configured to insert or remove the lighting effect insert 1042 in the light beam 1036 by moving the effect selector 1041. The motors 1043 and 1044 are configured to be operated in a coordinated manner such that lighting effect insert 1042 is inserted or removed from the light beam 1036, as well as rotated within the light beam 1036, in a direction and/or at a speed desired by an operator of the luminaire 1000.

The motors 1043 and 1044 may be of a type selected from, but not restricted to, stepper motor, servo-motor, actuator, solenoid, and other suitable motor types. In the configuration shown in FIG. 10, the lighting effect insert 1042 is shown positioned across light beam 1036 so as to create a lighting effect in the exiting light beam.

The lighting effect assembly 1050 includes a lighting effect insert 1052, rotatably coupled to an effect selector 1051. A motor 1054 is configured to rotate the lighting effect insert 1052 within the effect selector 1051. A motor 1053 is configured to insert or remove the lighting effect insert 1052 in the light beam 1036 by moving the effect selector 1051. The motors 1053 and 1054 are configured to be operated in a coordinated manner such that lighting effect insert 1052 is inserted or removed from the light beam 1036, as well as rotated within the light beam 1036, in a direction and/or at a speed desired by an operator of the luminaire 1000.

The motors 1053 and 1054 may be of a type selected from, but not restricted to, stepper motor, servo-motor, actuator, solenoid, and other suitable motor types. In the position shown in FIG. 10, the lighting effect insert 1052 is shown positioned outside of light beam 1036 and will have no effect on the exiting light beam.

In some embodiments, one or both of the lighting effect assemblies 1040 and 1050 systems may comprise sensors configured to inform a control system of the luminaire 1000 of specific orientations of rotation of the lighting effect inserts 1042 and 1052, and facilitate control of the lighting effect inserts 1042 and 1052 by such a control system. In the embodiment shown in FIG. 10, a mounting ring of the lighting effect insert 1052 is fitted with a magnet 1057 in its periphery that rotates with the lighting effect insert 1052. A corresponding sensor or sensors (not shown) such as a Hall effect sensor may detect a position of the magnet 57, and thus deduce the rotational position of the lighting effect insert 1052 and communicate the position to the control system. Similarly, a mounting ring of the lighting effect insert 1042 may be fitted with a magnet and sensor or sensors may detect a rotational position of the lighting effect insert 1042 and communicate the position to the control system. Such sensor systems are not restricted to a magnet and Hall effect sensor, and any sensing system may be utilized in other embodiments including, but not restricted to, magnetic sensors, optical sensors, switch sensors.

The lighting effect inserts 1042 and 1052 shown in FIG. 10 comprise, respectively, the prism 204 and the prism 104. In other embodiments, either of the lighting effect inserts 1042 and 1052 may comprise either of the lighting effect systems 400 and 600 or any of the prisms 104, 204, 804, and 904. In still other embodiments, the lighting effect insert 1042 or the lighting effect insert 1052 may comprise a conventional prism, i.e., a prism with clear color filter regions or facets. In some embodiments where, for example, the lighting effect insert 1052 comprises the lighting effect systems 400, the motor 1054 may be configured to rotate the effects plate 402 and a second motor configured to rotate the prism 404. In some embodiments, both of the lighting effect inserts 1042 and 1052 may be the same type of lighting effect system or prism according to the disclosure.

In still other embodiments, the lighting effect inserts 1042 and 1052 may, together, comprise the lighting effect system 400, with the lighting effect insert 1042 comprising the effects plate 402 and the lighting effect insert 1052 comprising the prism 404. Similarly, in other embodiments, the lighting effect inserts 1042 and 1052 may comprise, respectively, the effects plate 602 and the prism 604, thus collectively comprising the lighting effect system 600.

In various embodiments, the lighting effect insert 1042 and the lighting effect insert 1052 may be rotated simultaneously in a coordinated manner such that the angle between them remains constant. For example, both lighting effect systems may be rotated in the same direction at the same speeds, thus maintaining any difference in angle between them. In another example, the lighting effect inserts 1042 and 1052 may be rotated in a coordinated manner at differing speeds and/or differing directions. As described above, the independent sensors fitted to the lighting effect assemblies 1040 and 1050 inform the control system of the luminaire 1000 specific orientations of rotation of the lighting effect inserts 1042 and 1052. Such information may also facilitate coordination in the rotation and positioning of the lighting effect inserts 1042 and 1052. Speeds and rotation directions and positions may be accurately controlled through sensors such that accurate and repeatable kaleidoscopic effects may be achieved.

In other embodiments, the effect selectors 1041 and 1051 may each comprise two or more lighting effect inserts. In such embodiments, the control system of the luminaire 1000 is configured to control which, if any, of the plurality of lighting effect inserts on each of the effect selectors 1041 and 1051 is inserted in the beam and whether the lighting effect insert is rotated. Either or both of the effect selectors 1041 and 1051 may be an arm (as shown in FIG. 10), a wheel, or any other mechanism configured to position a lighting effect insert in the light beam 1036.

Figure 11:
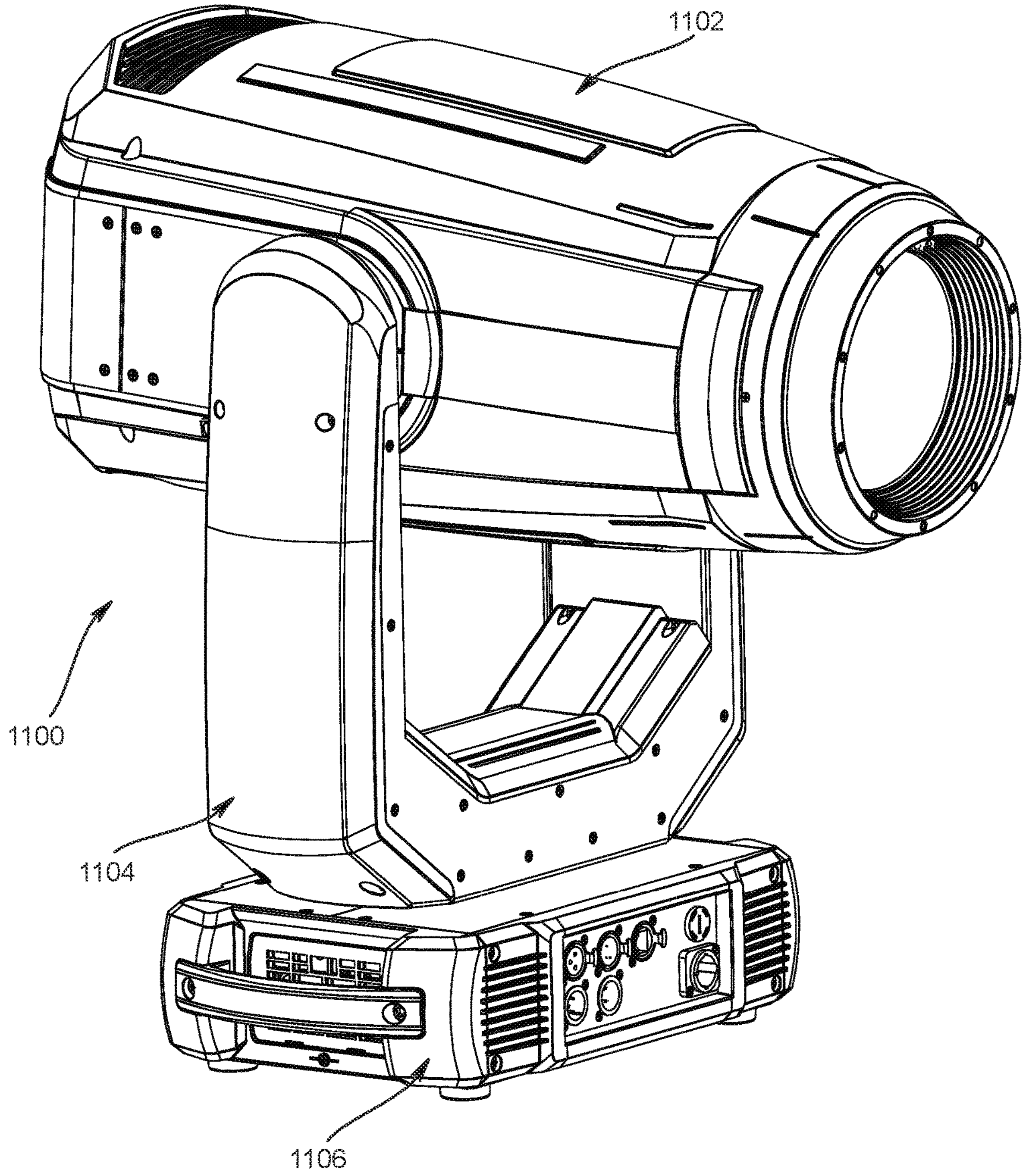
FIG. 11 presents an automated luminaire comprising a lighting effect system according to the disclosure.

FIG. 11 presents an automated luminaire 1100 comprising a lighting effect system according to the disclosure. The luminaire 1100 includes a luminaire head 1102 rotationally mounted in a yoke 1104. The luminaire head 1102 rotates within the yoke 1104 around a tilt axis of rotation. The yoke 1104 is rotationally coupled to a base 1106 and rotates around a pan axis of rotation. Some or all of the luminaire head 1102, the yoke 1104, and the base 1106 comprise electrical circuits that control rotation and mechanisms of the luminaire 1100. One or more of the luminaire head 1102, the yoke 1104, and the base 1106 may comprise power circuits to provide electrical power to the mechanisms of the luminaire 1100.

While only some embodiments of the disclosure have been described herein, those skilled in the art, having benefit of this disclosure, will appreciate that other embodiments may be devised which do not depart from the scope of the disclosure. While the disclosure has been described in detail, it should be understood that various changes, substitutions, and alterations can be made hereto without departing from the spirit and scope of the disclosure.

What is claimed is:

1. An optical system comprising:

a first lighting effect assembly comprising a first effect selector and a first lighting effect insert rotatably coupled to the first effect selector, wherein:

the first effect selector is configured to position the first lighting effect insert in a light beam passing through the optical system; and the first lighting effect insert comprises a first prism having a first rear surface and a first front side comprising a first plurality of facets, the first rear surface comprising a first plurality of regions, each region aligned with a corresponding facet of the first plurality of facets, wherein a first region of the first plurality of regions is configured as a color filter having a first color and a second region of the first plurality of regions is configured as a color filter having a second color; and a second lighting effect assembly comprising a second effect selector and a second lighting effect insert rotatably coupled to the second effect selector, wherein:

the second effect selector is configured to position the second lighting effect insert in the light beam; and the second lighting effect insert comprises a second prism having a second rear surface and a second front side comprising a second plurality of facets, the second rear surface comprising a second plurality of regions, each region aligned with a corresponding facet of the second plurality of facets, wherein a first region of the second plurality of regions is configured as a color filter having a third color and a second region of the second plurality of regions is configured as a color filter having a fourth color.

2. The optical system of claim 1, wherein one of the first and second colors is the same color as one of the third and fourth colors.

3. The optical system of claim 1, wherein all regions of the first plurality of regions are configured as clear color filters.

4. The optical system of claim 1, wherein the first lighting effect insert comprises a pyramidal prism or a linear prism.

5. The optical system of claim 1, wherein the first lighting effect assembly is configured to rotate the first lighting effect insert at a desired speed.

6. The optical system of claim 5, wherein the first lighting effect assembly is configured to rotate the first lighting effect insert in a desired direction.

7. An optical system comprising:

a lighting effect assembly comprising an effect selector and a lighting effect system rotatably coupled to the effect selector, wherein:

the effect selector is configured to position the lighting effect system in a light beam passing through the optical system with an optical axis of the lighting effect system coaxial with an optical axis of the light beam; and the lighting effect system comprises an effects plate and a prism, wherein:

the prism comprises a rear surface and a front side comprising a plurality of facets;

the effects plate comprises a surface having a plurality of regions, wherein a first region of the plurality of regions is configured as a color filter having a first color and a second region of the plurality of regions is configured as a color filter having a second color; and the light beam passes through the effects plate and is divided into a plurality of light beams corresponding to the plurality of regions and the plurality of light beams are projected in a plurality of directions corresponding to the plurality of facets.

8. The optical system of claim 7, wherein the lighting effect assembly is configured to rotate the effects plate at a first desired speed and to rotate the prism at a second desired speed.

9. The optical system of claim 8, wherein the lighting effect assembly is configured to rotate the effects plate in a first desired direction and to rotate the prism in a second desired direction.

10. The optical system of claim 7, wherein the effect selector is configured to position the effects plate and the prism independently in the light beam.

11. An optical system comprising:

a first lighting effect assembly comprising a first effect selector and a first lighting effect insert rotatably coupled to the first effect selector, wherein:

the first effect selector is configured to position the first lighting effect insert in a light beam passing through the optical system; and the first lighting effect insert comprises a first prism having a first front side comprising a first plurality of facets, wherein a first facet of the first plurality of facets is configured as a color filter having a first color and a second facet of the first plurality of facets is configured as a color filter having a second color; and a second lighting effect assembly comprising a second effect selector and a second lighting effect insert rotatably coupled to the second effect selector, wherein:

the second effect selector is configured to position the second lighting effect insert in the light beam; and the second lighting effect insert comprises a second prism having a second front side comprising a second plurality of facets, wherein a first facet of the second plurality of facets is configured as a color filter having a third color and a second facet of the second plurality of facets is configured as a color filter having a fourth color.

12. The optical system of claim 11, wherein one of the first and second colors is the same color as one of the third and fourth colors.

13. The optical system of claim 11, wherein all facets of the first plurality of facets are configured as clear color filters.

14. The optical system of claim 11, wherein the first lighting effect insert comprises a pyramidal prism or a linear prism.

15. The optical system of claim 11, wherein the first lighting effect assembly is configured to rotate the first lighting effect insert at a desired speed.

16. The optical system of claim 15, wherein the first lighting effect assembly is configured to rotate the first lighting effect insert in a desired direction.

17. A luminaire comprising:

a head comprising:

a light source, configured to emit a light beam;

a first lighting effect assembly comprising a first effect selector and a first lighting effect insert rotatably coupled to the first effect selector, wherein:

the first effect selector is configured to position the first lighting effect insert in the light beam; and the first lighting effect insert comprises a first prism having a first rear surface and a first front side comprising a first plurality of facets, the first rear surface comprising a first plurality of regions, each region aligned with a corresponding facet of the first plurality of facets, wherein a first region of the first plurality of regions is configured as a color filter having a first color and a second region of the first plurality of regions is configured as a color filter having a second color; and a second lighting effect assembly comprising a second effect selector and a second lighting effect insert rotatably coupled to the second effect selector, wherein:

the second effect selector is configured to position the second lighting effect insert in the light beam; and the second lighting effect insert comprises a second prism having a second rear surface and a second front side comprising a second plurality of facets, the second rear surface comprising a second plurality of regions, each region aligned with a corresponding facet of the second plurality of facets, wherein a first region of the second plurality of regions is configured as a color filter having a third color and a second region of the second plurality of regions is configured as a color filter having a fourth color; and power circuits configured to provide electrical power to electrical circuits of the head.

18. The luminaire of claim 17, wherein one of the first and second colors is the same color as one of the third and fourth colors.

19. The luminaire of claim 17, wherein all regions of the first plurality of regions are configured as clear color filters.

20. The luminaire of claim 17, wherein the first lighting effect assembly is configured to rotate the first lighting effect insert at a desired speed.

21. The luminaire of claim 20, wherein the first lighting effect assembly is configured to rotate the first lighting effect insert in a desired direction.

22. The luminaire of claim 17, further comprising:

a yoke, wherein the head is rotatably mounted in the yoke for rotation about a tilt axis.

23. The luminaire of claim 22, further comprising:

a base, wherein the yoke is rotatably mounted to the base for rotation about a pan axis.

* * * * *